United States Patent [19]

Singh

[11] Patent Number: 5,320,134

[45] Date of Patent: Jun. 14, 1994

[54] SQUEEZE FILM SHAFT DAMPER OIL SYSTEM

[75] Inventor: Anant P. Singh, Cincinnati, Ohio

[73] Assignee: General Electric Company, Cincinnati, Ohio

[21] Appl. No.: 87,838

[22] Filed: Jul. 2, 1993

Related U.S. Application Data

[60] Continuation of Ser. No. 928,383, Aug. 12, 1992, abandoned, Division of Ser. No. 770,826, Oct. 4, 1991, Pat. No. 5,169,241.

[51] Int. Cl.⁵ .............................................. F16K 15/14
[52] U.S. Cl. .................................. 137/454.5; 137/846
[58] Field of Search ...................... 137/846, 850, 454.5

[56] References Cited

U.S. PATENT DOCUMENTS

| | | | |
|---|---|---|---|
| 657,007 | 8/1900 | Richter | 137/846 X |
| 996,588 | 6/1911 | Kennedy | 137/846 X |
| 2,594,320 | 4/1952 | LeClair | 137/846 X |
| 3,116,747 | 1/1964 | Cowles | 137/846 X |
| 3,710,942 | 1/1973 | Rosenberg | 137/846 X |

*Primary Examiner*—Robert G. Nilson
*Attorney, Agent, or Firm*—Jerome C. Squillaro; John R. Rafter

[57] ABSTRACT

A non-symmetrical circular row of oil inlets are located in a circular manifold surrounding a squeeze film space in a squeeze film damper. The oil inlets are directed radially inwardly from said manifold to open into the squeeze film space. Certain cluster of inlets provide higher oil pressure to the squeeze film space than other inlets. All inlets are equipped with automatically closing synthetic rubber check valves.

5 Claims, 2 Drawing Sheets

SQUEEZE FILM SHAFT DAMPER OIL SYSTEM

This application is a continuation of application Ser. No. 07/928,383, filed Aug. 12, 1992, now abandoned which application is a division of application Ser. No. 07/770,826, filed Oct. 4, 1991, now U.S. Pat. No. 5,169,241.

BACKGROUND OF THE INVENTION

This invention relates to a squeeze film shaft damper oil system and more particularly to a circular array of radial oil inlets at unequally spaced and non-symmetrical positions circumferentially about the squeeze film space in a damper with a frequency independent, flexibility responsive, check valve in each inlet.

In a typical squeeze film shaft damper, a bearing support member such as the outer race of a rolling element bearing supported shaft is fitted in an annular chamber in its bearing housing to have limited radial motion therein. The outer planar surface of the outer race fits closely adjacent the opposed annular chamber wall to define a thin annular squeeze film space into which damper oil is introduced. Vibratory or radial motion of the shaft and its bearing generate hydrodynamic forces in the damper oil in the squeeze film space for damping purposes.

One problem associated with dampers as described involves orbital motion of a shaft. For example, in a camper bearing application for hot gas turbine engines, such as aircraft gas turbine engines, a turbine rotor/shaft imbalance may cause the shaft to undergo some limited orbital motion. This orbital motion causes alternate squeezing of the squeeze film space for very high oil pressure at one peripheral region and a lower pressure at an opposite region. The alternating action causes oil in the squeeze film space to flow circumferentially with an unequal pressure distribution such that, at the lower pressure region there may be a lack of a sufficient quantity of oil for damping effectiveness, referred to as cavitation or oil starvation. For this reason it has been a practice to utilize oil systems which supply oil to the low pressure region of the operating damper to prevent cavitation and modulate peripheral pressures in the squeeze film space. Such systems usually require complex and rigorous oil flow check valves to prevent backflow of high pressure oil from the rotating hydrodynamic peak pressure regions of the squeeze film space into the oil supply system. In addition, peripheral location of oil inlets are not always in an arrangement which accommodates both variable and static conditions of the damper.

OBJECTS OF THE INVENTION

It is an object of this invention to provide an improved oil supply system for squeeze film dampers.

It is another object of this invention to provide an improved peripheral arrangement of oil inlets into a squeeze film damper.

It is a further object of this invention to provide an improved oil flow check valve for squeeze film damper oil supply systems.

It is a still further object of this invention to provide a frequency independent, flexibility responsive, check valve controlled peripheral and radial oil supply system for squeeze film shaft dampers.

SUMMARY OF THE INVENTION

In a squeeze film shaft damper defining an annular squeeze film space, a dual section, dual pressure, circumferential oil manifold concentrically surrounds the squeeze film space. A non-symmetrical row of radially inwardly directed oil inlets open into the squeeze film space at predeterminedly advantageous locations with some of said inlets providing higher pressure oil than others. Each inlet is provided with a non-frequency dependent synthetic resin check valve to prevent backflow of oil through the inlet.

This invention will be better understood when taken in connection with the following drawings and description.

DESCRIPTION OF PREFERRED EMBODIMENTS

Figure 1:
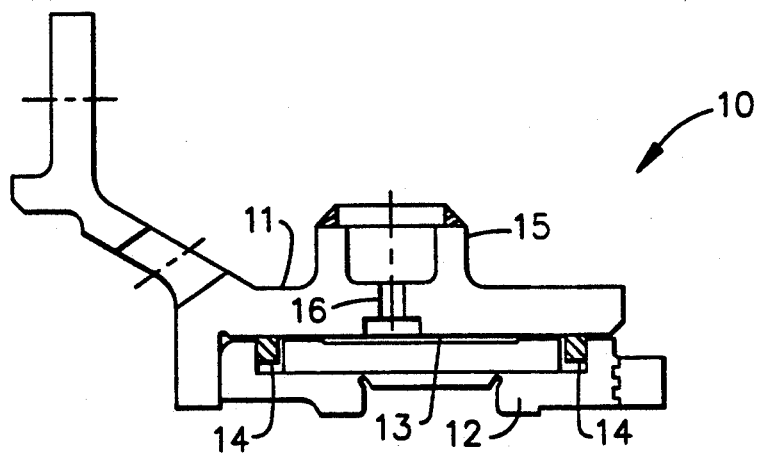
FIG. 1 is a partial and schematic view of a squeeze film damper to which this invention is applicable.

Referring now to FIG. 1, damper assembly 10 comprises a rolling element bearing housing 11 in which an outer annular race 12 of a rolling element bearing is fitted for limited radial motion. Outer race 12 fits closely adjacent an opposed housing wall to define a thin annular oil filled squeeze film space 13 which is closed or sealed by means of spaced piston rings 14 positioned in annular grooves in race 12 and bearing against the opposite wall of housing 11. An oil supply system for damper 10 may comprise a circumferential oil channel or manifold 15 concentrically surrounding squeeze film space 13, and damper oil is supplied to space 13 from a plurality of circumferentially spaced and radially inwardly oriented oil inlets 16 leading from manifold 15 into squeeze film space 13 or interconnecting manifold 15 and squeeze film space 13 in fluid flow relationship as illustrated in FIG. 2.

Figure 2:
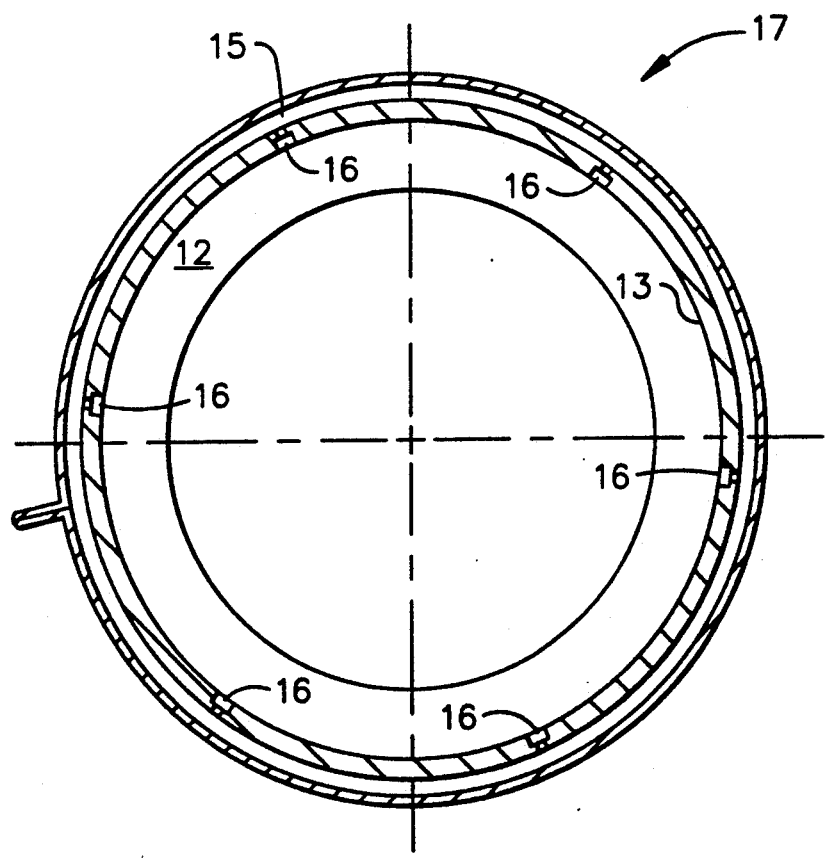
FIG. 2 is a cross-sectional and plan view of an oil supply system for the damper of FIG. 1.

Referring now to FIG. 2, oil supply system 17 comprises circumferential channel or manifold 15 concentrically surrounding damper assembly 10 and squeeze film space 13. Manifold 15 is usually located at the axial midpoint of a damper such as damper 10 of FIG. 1. Radial oil inlets 16 are usually positioned peripherally equidistantly in manifold 15 such as, in FIG. 2 at about 60° circumferentially spaced locations.

The oil supply system as illustrated in FIG. 2 has not been found to be optimally effective over a full range of damper operation. For example, a critical period for damper operation with respect to hot gas turbine engines is initial start up rotation of the turbine wheel and its shaft. After a long rest or non-operating period of time, the shaft supporting the relatively massive turbine wheel becomes very slightly bowed or set. Rapid start up under these conditions includes an initial high degree of orbiting motion of the shaft which imposes severe requirements on the damper and its oil supply system which may not provide an immediate lift off of the shaft and full support of the shaft by oil in squeeze film space 13. Under normal operating or running conditions, an oil supply system should immediately supply oil to the low pressure or cavitation side of the damper while preventing exit of high pressure oil from the squeeze film space when at its minimum thickness. An improved oil system which accommodates the noted problems is shown in FIG. 3.

Figure 3:
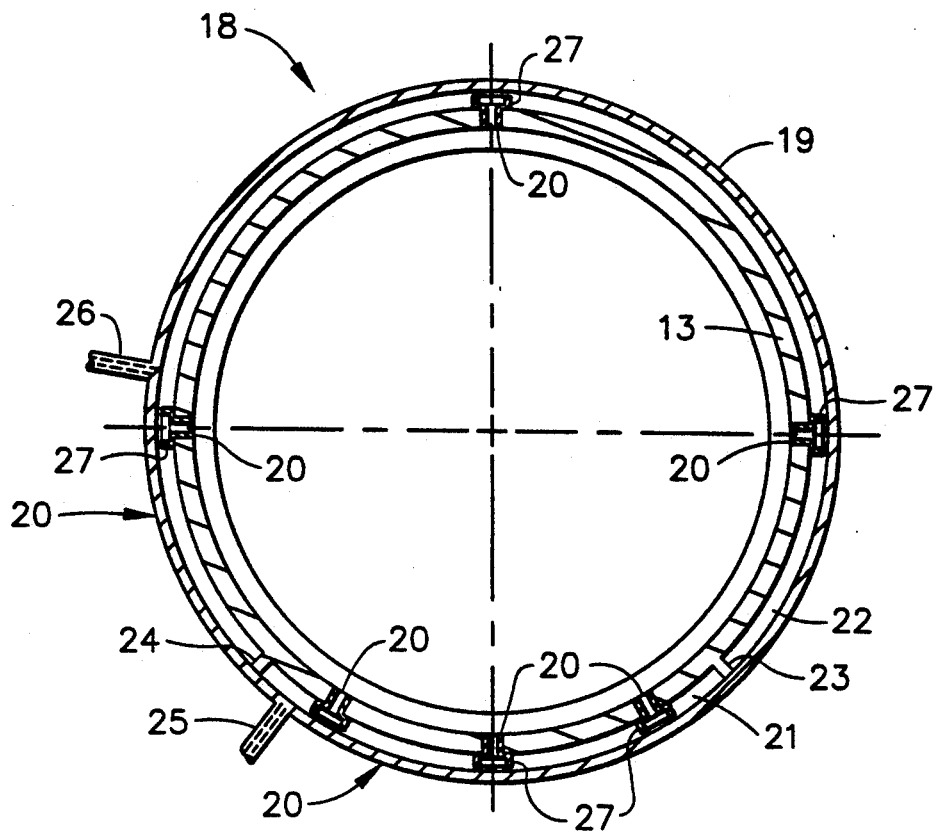
FIG. 3 is a cross-sectional and plan view of the improved oil supply system of this invention as applied to the FIG. 1 damper.

Referring now to FIG. 3, an improved oil system 18 comprises a modified circumferential manifold or channel 19 with modified oil inlets 20. Modified radial oil inlets 20 are not arranged in equidistant circumferential relationship. Oil inlets 20 are arranged non-symmetrically circumferentially, in that, of the 6 inlets illustrated, four are arranged at 90° intervals, but at the 180° position, the remaining two inlets are positioned closely adjacent the oil inlet at the 180° region which is described as the rest position of the gas turbine engine. This cluster or concentration of three or more inlets at the 180° region will supply the necessary oil at the shaft rest position on start up of the engine to lift race 12 from contact with housing 11 for better start up operation and cavitation control. Higher pressure oil to the cluster of inlets is advantageous for lift off and start up operation. In order to provide higher pressure oil to the cluster of oil inlets 20 a dual pressure manifold 19 is utilized. Dual pressure manifold 19 comprises a pair of separate and independent manifold segments 21 and 22 defined by inner partitions 23 and 24 which effectively separate manifold 19 into the pair of arc segments 21 and 22. One segment 21 is connected to its separate oil supply by conduit 25 and serves the cluster of inlets 20 in the 180° region. The other segment 22 serves the remaining oil inlets and is connected, by means of conduit 26, to a supply of oil at a pressure different from, and lower than, the supply of oil for segment 21. Oil system 18 is a dual pressure system with a non-symmetrical circumferential array of oil inlets 20 operative to supply higher pressure oil to select or cluster inlets.

The higher pressure oil flowing to the cluster of inlets is prevented from backflowing through the inlets in the cluster or through other inlets by means of an improved combined oil inlet and check valve structure 27. This check valve structure 27 is used in each oil inlet to prevent any backflow of oil due to high oil pressures generated in the damper during its operation. A cross-sectional illustration of such a combination oil inlet and check valve structure 27 is illustrated in FIG. 4.

Figure 4:
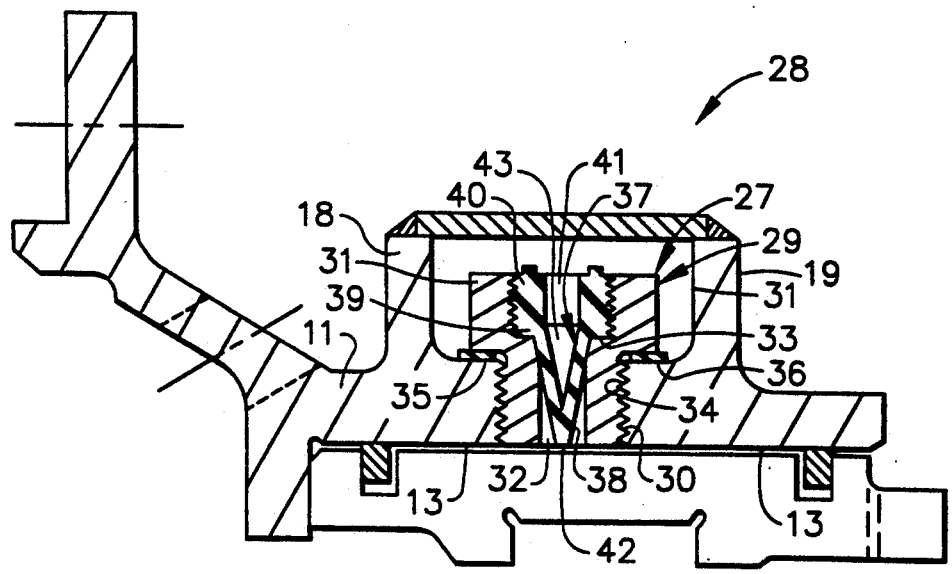
FIG. 4 is a schematic and cross-sectional view of the improved automatic check valve of this invention in a radial oil inlet.

Referring now to FIG. 4, the dual manifold assembly 28 similar to manifold 19 of FIG. 3, includes therein a combined oil inlet and check valve structure 27 for each oil inlet 20 of FIG. 3. Structure unit 27 comprises a hollow step bushing member 29 having an externally threaded shaft or shank part 30 with an expanded head part 31. Bushing 29 also includes a stepped coaxial passage 32 therethrough with a narrow part of a passage 32 in the shank part of the bushing and an enlarged part or counterbore in the head part 31. A shoulder 33 separates the passage sections. Bushing 29 is threaded into an appropriately threaded opening 34 in housing 11 opening into squeeze film space 13. The expanded head part 31 of bushing 29 is enclosed by manifold 19 (FIG. 3) which encircles squeeze film space 13 and defines a shoulder 35 for inlet openings 34. The expanded hollow head 31 of bushing 29 also defines a threaded counterbore opening into bushing 29 and rests on a gasket 36 on shoulder 35. As described, hollow bushing 29 defines a stepped cylindrical passage interconnecting manifold 19 and squeeze film space 13 in fluid flow relationship.

Manifold 19 is larger than expanded head 31 so that, when manifold 19 is filled with oil, expanded head 31 is submerged and oil may flow through bushing 29 into squeeze film space 13. However, a synthetic rubber uniflow or single direction flow check valve 37 is inserted into bushing 29 to prevent backflow of oil from squeeze film space 13 into manifold 19.

Check valve 37 comprises a hollow conical section 38 with its cone base radially flared to form a gasket flange section 39 which rests on shoulder 33 of bushing 29. A threaded cover plate 40 with a concentric aperture 41 therethrough is threaded into the expanded and internally threaded head of bushing 29 to engage the flange extension 39 of cone 38 between the cover plate and shoulder 33. The described clamping arrangement prevents cone check valve 37 from being forced, by high pressure oil flow, into squeeze film space 13. Conical section 38 of valve 37 has a small opening at its apex 42 to define an open oil flow channel from manifold 19 into squeeze film space 13 which remains open under the flow of oil in or through the cone section 38 into squeeze film space 13. In the event of a very high build up of oil pressure in space 13 tending to force oil into bushing 29 in a direction toward manifold 19, oil is forced into the intervening passage space between cone section 38 and bushing 29. Due to the readily flexible nature of the material of cone section 38, cone section 38 is caused to collapse inwardly along its axis to seal off the opening at its apex 42 as well as a significant extent of its interior conical space 43 and preventing backflow of oil from squeeze film space 13 into manifold 19. Check valve 37 is expeditiously produced from a strong durable but easily flexible material such as a synthetic rubber material. It is this flexibility which expands cone section 38 for full flow of oil into squeeze film space 13, and provides a rapid collapse, as described, for backflow conditions. Check valve 37 is described as a flexibility responsive check valve operationally independent of vibration frequency.

Concentric aperture 41 of cover plate 40 is a metering feed aperture of a predetermined size to control the flow rate of oil passing through check valve 37.

The number of oil inlets for the dual pressure system of this invention may vary according to the needs of specific engine designs. One example of such a system, as illustrated in FIG. 3, may comprise six inlets arranged at the clock hour positions of 12, 3, 5, 6, 7 and 9 o'clock, an arrangement which provides a cluster of three inlets adjacent the 180° or rest position.

The dual pressure oil system of this invention with non-symmetrical peripheral distribution of oil inlets, provides higher pressure oil to a group or cluster of oil inlets to the squeeze film space at the rest position of a shaft and its damper bearing race, and lower pressure oil to the remaining inlets. Backflow of oil from all inlets is effectively controlled by means of self-acting flexibility responsive and vibration frequency independent check valves.

This invention particularly provides an improved oil system for an annular squeeze film damper which comprises a hollow manifold encircling the damper squeeze film space and a plurality of oil inlet means circumferentially distributed in a non-symmetrical manner along the manifold and opening from the manifold into the squeeze film space. The non-symmetrical arrangement provides a cluster of oil inlet means located near the rest position of the damper. The described system is broadly applicable to various damper applications involving other than rolling element bearings such as, for example, anti-friction and hydrodynamic journal bearings.

While this invention has been disclosed and described with respect to the preferred embodiments thereof, it will be understood by those skilled in the art that various changes and modifications may be made without departing from the spirit and scope of the invention of the following claims.

What is claimed is:

1. A shaft damper oil system check valve comprising in combination
    (a) a hollow step bushing member,
    (b) said bushing member having a stepped coaxial concentric passage therethrough, comprising an externally threaded shank part and an internally threaded counterbore expanded head part, wherein the passage in said shank part is narrower than in said head part and a shoulder separates said shank and head parts,
    (c) a coaxial housing internally threaded for receiving said externally threaded shank portion of said bushing,
    (d) a synthetic rubber valve member comprising a hollow conical section and positioned concentrically in said passage and adapted to permit oil flow through said conical section in one direction, said hollow conical section having a lip portion abutting said bushing shoulder, a radially flared cone base and a conical interior space wherein said conical section remains open, expanding for full flow of fluid into said squeeze film space and rapidly collapsing inwardly to seal off backflow of fluid into said inlet openings, and
    (e) a threaded cover plate for insertion within said head part of said bushing member and for retaining said check valve and defining a first squeeze film damper space; said cover plate having a metering aperture controlling fluid flow into said check valve.

2. The invention as recited in claim 1 wherein said conical interior space extends from an apex of said hollow conical section to said radially flared cone base and wherein said hollow conical section is vibration frequency independent to remain flexibly open under flow of damper fluid under pressure through said hollow conical section and flexibly collapse along a significant extent of said conical interior space under a reverse flow of oil through said bushing member.

3. The shaft damper oil system check valve of claim 1 further comprising
    (f) a manifold cover for enclosing said head part of said bushing member for circumscribing and defining a second squeeze film space.

4. The shaft damper oil system check valve of claim 1 wherein said housing has a shoulder for receiving said bushing shoulder and a gasket for insertion between said housing and bushing shoulders.

5. A shaft damper oil system check valve comprising in combination
    (a) a bushing member,
    (b) said bushing member having a concentric passage therethrough,
    (c) a synthetic rubber valve member comprising a hollow conical section and positioned concentrically in said passage and adapted to permit oil flow through said conical section in one direction, said hollow conical section having a radially flared cone base and a conical interior space.
    (d) a cover plate is positioned concentrically in an expanded head of said bushing member over said radially flared cone base of said hollow conical section, said cover plate having a concentric metering aperture therein to control the quantity of damper oil flowing through said hollow conical section which extends into an externally threaded shank part of said bushing member,
    (e) wherein said conical interior space extends from an apex of said hollow conical section to said radially flared cone base and wherein said hollow conical section is vibration frequency independent to remain flexibly open under flow of damper fluid under pressure through said hollow conical section and flexibly collapse along a significant extent of said conical interior space under a reverse flow of oil through said bushing member.

* * * * *